United States Patent
Hashemian

(10) Patent No.: US 7,478,010 B2
(45) Date of Patent: Jan. 13, 2009

(54) CONDITION MONITORING OF ELECTRICAL CABLES AS INSTALLED IN INDUSTRIAL PROCESSES

(75) Inventor: Hashem M. Hashemian, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 0 days.

(21) Appl. No.: 11/781,351

(22) Filed: Jul. 23, 2007

(65) Prior Publication Data

US 2008/0015817 A1   Jan. 17, 2008

Related U.S. Application Data

(60) Division of application No. 11/100,661, filed on Apr. 7, 2005, now Pat. No. 7,254,520, which is a continuation-in-part of application No. 11/018,292, filed on Dec. 21, 2004, now Pat. No. 6,973,413, and a continuation-in-part of application No. 10/438,356, filed on May 14, 2003, now Pat. No. 6,915,237.

(60) Provisional application No. 60/380,516, filed on May 14, 2002.

(51) Int. Cl.
    *G06F 19/00* (2006.01)
(52) U.S. Cl. .......................... 702/151; 700/9
(58) Field of Classification Search ........... 702/151, 702/183, 57–59, 118, 121, 182, 185, 199; 700/9, 21, 29, 49, 108, 110, 174
See application file for complete search history.

(56) References Cited

U.S. PATENT DOCUMENTS

| | | | |
|---|---|---|---|
| 4,184,205 A | | 1/1980 | Morrow |
| 4,295,128 A | | 10/1981 | Hashemian et al. |
| 5,195,046 A | * | 3/1993 | Gerardi et al. ............ 702/35 |
| 5,616,824 A | | 4/1997 | Abdel-Malek et al. |
| 5,764,509 A | | 6/1998 | Gross et al. |
| 6,633,782 B1 | | 10/2003 | Schleiss et al. |
| 2005/0182581 A1 | | 8/2005 | Hashemian |

OTHER PUBLICATIONS

Hashemian, et al., "Long Term Performance and Aging Characteristics of Nuclear Plant Pressure Transmitters", U.S. Nuclear Regulatory Commission, NUREG/CR-5851, Mar. 1993.

(Continued)

*Primary Examiner*—Edward Raymond
(74) *Attorney, Agent, or Firm*—Pitts & Brittian PC

(57) ABSTRACT

A system and method for verifying the performance and health of wire systems and end devices, including instruments and processes. A computer runs software that collects data from sampled sensors, stores the data, screens the data for outliers, analyzes the data, performs in situ testing, and generates results of the analysis and testing. The system and method verifies not only the steady state performance of instruments, but also the dynamic performance of instruments and the transient behavior of the processes. In one embodiment, the system performs testing of the wiring system connecting the end devices located at the process. In another embodiment, the system also performs analysis of the amplitude probability density and a power spectral density determined from the sensor, or end device, data. In still another embodiment, the system performs a time domain reflectometry (TDR) analysis for a wiring system connecting an end device.

12 Claims, 13 Drawing Sheets

OTHER PUBLICATIONS

"On-Line Monitoring of Instrument Channel Performance", EPRI Technical Report TR104965-R1 NRC SER, Sep. 2000.

Hashemian, et al., "Management of Aging of I&C Equipment in Nuclear Power Plants", IAEA Publication TECDOC-1147, Vienna, Austria Jun. 2000.

Hashemian, et al., "Advanced Instrumentation and Maintenance Technologies for Nuclear Power Plants", U.S. Nuclear Regulatory Commission, NUREG/CR-5501, Aug. 1998.

Hashemian, et al., "Aging of Nuclear Plant Resistance Temperature Detectors", U.S. Nuclear Regulatory Commission, NUREG/CR-5560. Jun. 1990.

Hashemian, "On-Line Testing of Calibration of Process Instrumentation Channels in Nuclear Power Plants", U.S. Nuclear Regulatory Commission, NUREG/CR-6343, Nov. 1995.

Hashemian, et al., "Effect of Aging on Response Time of Nuclear Plant Pressure Sensors", U.S. Nuclear Regulatory Commission, NUREG/CR-5383, Jun. 1989.

Hashemian, et al., "Validation of Smart Sensor Technologies for Instrument Calibration Reduction in Nuclear Power Plants", U.S. Nuclear Regulatory Commission, NUREG/CR-5903, Jan. 1993.

Hashemian, "New Technology for Remote Testing of Response Time of Installed Thermocouples", US Air Force, Arnold Engineering Development Center, AEDC-TR-91-26, vol. 1-Thermocouple Response Time Test Instrumentation, Jan. 1992.

Hashemian, "Advanced Sensor and New I&C Maintenance Technologies for Nuclear Power Plants", Jun. 1999.

Hashemian, "Review of Advanced Instrumentation and Maintenance Technologies for Nuclear Power Plants", presented at the 43rd Annual ISA POWID Conference 2000, San Antonio, TX Jun. 4-9, 2000.

Hashemian, "Increasing Instrument Calibration Intervals," presented at the 44th Annual ISA POWID Conference 2001, Orlando, FL, Jul. 07-13, 2001.

Hashemian, "Optimized Maintenance and Management of Ageing of Critical Equipment in Support of Plant Life Extension," presented at the 2000 ANS/ENS International Meeting, Washing, DC, Nov. 12-16, 2000.

"Hines Research Summaries," http://web.utk.edu/~hines/research.html.

Hashemian, "Power Uprating in PWR Plants By Better Measurement of Reactor Coolant Flow," presented at the 2000 ANS/ENS International Meeting, Washington, DC, Nov. 12-16, 2000.

Bond et al., "Integration of Monitoring and Diagnostics Into Nuclear Plant Instrumentation and Control Upgrades," Westinghouse Electric Corporation, PLEX '93 Conference—Zurich, Switzerland, Nov. 12-Dec. 1, 1993.

May, "Portable Work Station for Calibration of Instruments in Nuclear Power Plants," Levy Systems, EPRI Workshop, Mar. 10, 1987.

Redundant Instrument Monitoring System (RIMS System), CANUS Corporation, Laguna Hills, CA.

Meyer, "Data Analysis & Findings," Calibration Reduction Meeting, CT, 1989.

Gross et al., "Sequential Probability Ratio Test for Nuclear Plant Component Surveillance," Argonne National Laboratory, Nuclear Technology, vol. 93, Feb. 1991.

Mott et al., "Pattern-Recognition Software for Plant Surveillance," EI International, Inc., and King, Argonne National Laboratory.

Rusaw, "Instrumentation Calibration and Monitoring Program (ICMP at V.C. Summer Nuclear Station," Oct. 6, 1994.

Hughes, "Instrumentation Calibration and Monitoring Program—Calculation Methodology at South Texas Project".

"Use of As-Found/As-Left Calibration Data," SP67.04 Committee Item 7 Technical Report, Jun. 4, 1993.

Gross et al., "ICMP Surveillance Systems from Argonne National Laboratory".

Wooten, "Instrument Calibration and Monitoring Program," a presentation to the Nuclear Regulatory Commission, Oct. 13, 1994.

Holbert et al., "Empirical Process Modeling Technique for Signal Validation," Ann. Nucl. Energy, vol. 21, pp. 387-403, 1994.

Upadhyaya et al., "Application of Neutral Networks for Sensor Validation and Plant Monitoring," University of TN, Nuclear Technology, vol. 97, Feb. 1992.

Holbert et al., "Redundant Sensor Validation by Using Fuzzy Logic," Nuclear Science and Engineering 118, pp. 54-64, May 1994.

Uhrig, "Potential Use of Neutral Networks in Nuclear Power Plants," Univ. of TN, Proceedings of the 8th Power Plant Dynamics Control & Testing Symposium, Knoxville, TN, May 27-29, 1992.

Sackett, "Application of A1 Technology to Nuclear Plant Operations," Argonne National Laboratory, ASEE Annual Conference, Portland, OR, Jun. 19-24, 1988.

Holbert et al., "Development and Testing of an Integrated Signal Validation System for Nuclear Power Plants," The Univ. of TN, DOE/NE/37959-36, Oct. 1989.

Stansberry et al., "Manual for AMS Calibration Reduction System Prototype," Analysis and Measurement Services Corp., prepared for Duke Power Company, CRS9201R1, Feb. 1992.

James, Calibration Through On-Line Performance Monitoring of Instrument Channels, Electric Power Research Institute, TR-104965 Draft, Aug. 1995.

"An Evaluation of the Use of Signal Validation Techniques as a Defense Against Common-Cause Failures," Los Alamos Technical Associates, EPRI NP-5081, Feb. 1987.

Davis et al., "Calibration Reduction and the Instrument Performance Assessment Software System," EPRI I&C Workshop, St. Petersburg, FL, Dec. 11, 1997.

Dorr et al., "Detection, Isolation and Identification of Sensor Faults in Nuclear Power Plants," IEEE Transactions on Control Systems Technology, vol. 5, No. 1, Jan. 1997.

"Regulatory Guide 1.105—Instrument Setpoints," U.S. Nuclear Regulatory Commission, Nov. 1976.

"Regulatory Guide 1.160—Monitoring the Effectiveness of Maintenance at Nuclear Power Plants," U.S. Nuclear Regulatory Commission, Jun. 1993.

"Instrument Calibration and Monitoring Program, vol. 1: Basis for the Method," Science Applications International Corp., EPRI-TR-103436-V1, Dec. 1993.

"Instrument Calibration and Monitoring Program, vol. 2: Failure Modes and Effects Analysis," Science Applications International Corp., EPRI-TR-103436-V2, Dec. 1993.

Thie, "Surveillance of Instrumentation Channels at Nuclear Power Plants," EPRI NP-6067, Oct. 1988.

Thie, "Utility Requirements for Human-Centered Automation in Surveillance Testing," EPRI TR-100814, Aug. 1992.

Frogner et al., "Signal Validation by Combining Model-Based and Evidential Reasoning Approaches," Expert-Ease Systems, ISA Proceedings, 1988.

Upadhyaya, "Sensor Failure Detection and Estimation," Univ. of TN, Nuclear Safety, vol. 26, No. 1, Jan.-Feb. 1985.

"SureSense Online Signal Validation Software," http://aiaa.knowledgesharing.com/scripts/nls_ax.dll/w3SuccItem(2202414), http://www.expmicrosys.com/.

"Dynamic Sensor Data Validation for Reusable Launch Vehicle Propulsion," http://www.techtransfer.anl.gov/highlights/8-3/transportation.html.

Holbert et al., "Instrument Calibration Reduction Using Signal Validation," Transactions of the American Nuclear Society, vol. 69, pp. 372-373, 1993.

"On-Line Monitoring," EPRI, Dec. 2002, http://www.epri.com/OrderableitemDesc.asp?product_id=1007553.

"DOE—EPRI On-Line Monitoring Implementation Guidelines," EPRI, Jan. 2003, http://www.epri.com/OrderableitemDesc.asp?product_id=000000000001007622&targetnid=262206&valu....

"Computer Codes: MSET," Argonne National Laboratory, http://www.rae.anl.gov/codes/mset/.

* cited by examiner

CONDITION MONITORING OF ELECTRICAL CABLES AS INSTALLED IN INDUSTRIAL PROCESSES

CROSS-REFERENCE TO RELATED APPLICATIONS

This Application is a divisional application of U.S. application Ser. No. 11/100,661, filed Apr. 7, 2005, which is a continuation-in-part application of U.S. application Ser. No. 10/438,356, filed May 14, 2003, which issued as U.S. Pat. No. 6,915,237 on Jul. 5, 2005, and U.S. application Ser. No. 11/018,292, filed Dec. 21, 2004, which issued as U.S. Pat. No. 6,973,413 on Dec. 6, 2005, both of which claim the benefit of U.S. Provisional Application Ser. No. 60/380,516 filed on May 14, 2002.

BACKGROUND OF THE INVENTION

1. Field of Invention

This invention pertains to a system for verifying the performance of wire systems and end devices (process instruments and other equipment) as well as the process itself. More particularly, this invention pertains to providing predictive maintenance and management of aging of plant instruments and processes by testing and analyzing the instruments and equipment, including their wiring systems.

2. Description of the Related Art

Process instruments measure process parameters such as temperature, pressure, level, flow, and flux. A process instrument typically consists of a sensor to measure a process parameter and associated equipment to convert the output of the sensor to a measurable signal such as a voltage or a current signal.

Accuracy and response time are two characteristics of process instruments. Accuracy is a measure of how well the value of a process parameter is measured and response time is a measure of how fast the instrument responds to a change in the process parameter being measured.

To verify the accuracy of a process instrument, it is typically calibrated. To verify the response time of a process instrument, it is typically response time tested. The calibration and response time testing can be performed in a laboratory, but it is desirable to perform the calibration and response time testing while the instrument is installed in the plant and as the plant is operating. When an instrument is tested while installed in a process, the work is referred to as in situ testing. If this can be done while the plant is operating, the work is referred to as on-line testing. In addition to calibration and response time testing, there is value in testing the wiring system of an instrument (i.e., the cables, connectors, and splices).

BRIEF SUMMARY OF THE INVENTION

According to one embodiment of the present invention, an integrated system for verifying the performance and health of wire systems and end devices, including instruments and processes, is provided. The system combines on-line and in situ testing and calibration monitoring. In one embodiment, the system performs analysis of the wiring system connected to the end devices. In another embodiment, the system also performs analysis of the amplitude probability density and a power spectral density determined from the sensor, or end device, data. In still another embodiment, the system performs a time domain reflectometry (TDR) analysis for a wiring system connecting an end device. In this embodiment, the system outputs the signals for performing the TDR and the system analyzes the resulting data.

In one embodiment, the system samples the output of existing instruments in operating processes in a manner that allows verification of both calibration (static behavior) and response time (dynamic behavior) of instruments as installed in operating processes, performs measurements of calibration and response time if on-line tests show significant degradation, and integration of these testing tools into a program of testing that includes the necessary technologies and equipment. The tests described herein are suitable for performing in-situ using the methods described herein. The methods described herein use the combined results of on-line calibration verification, in-situ response time measurements, and in-situ cable testing to provide a complete assessment of an instrument health and aging condition. The tests include, but are not limited to, loop current step response (LCSR); loop resistance, insulation resistance, inductance, and capacitance measurements (LCR); TDR, and insulation resistance (IR). The test methods for wiring systems and end devices described herein are useful not only for sensors and instruments, but also for other electrical equipment such as motors, stators, and actuators.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
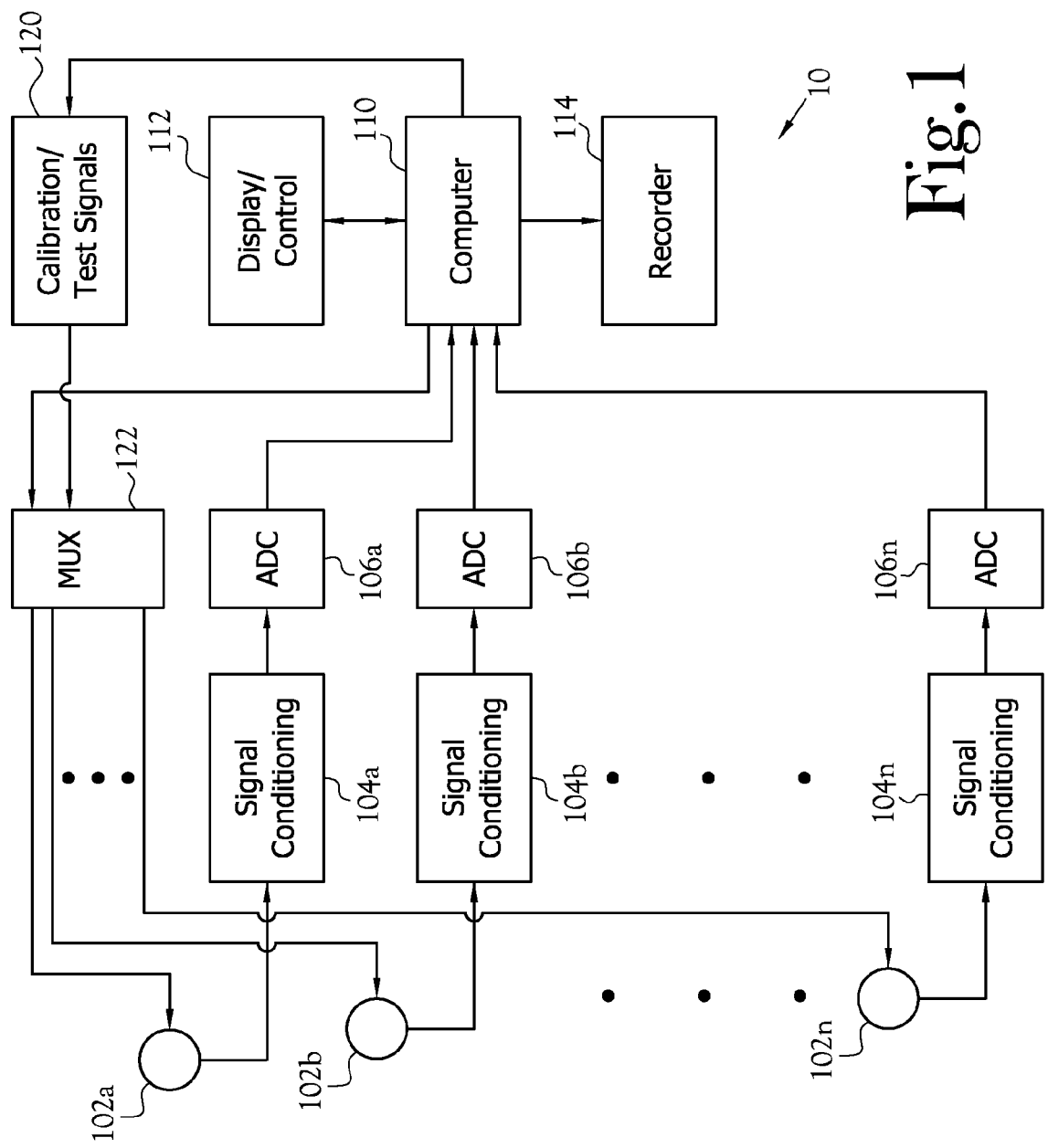
FIG. 1 is a block diagram of one embodiment of the integrated system.

An integrated system for monitoring the performance and health of instruments and processes and for providing predictive maintenance and management of aging of plant instruments and processes is disclosed. One embodiment of the system 10, as implemented with a computer 110, is illustrated in FIG. 1. The integrated system 10 detects instrument calibration drift, response time degradation, vibration signatures of the process and its components, cable condition data, existence and extent of blockages in pressure sensing lines and elsewhere in the system, fouling of venturi flow elements, and fluid flow rate, among other instrument and process conditions and problems.

The system 10 integrates an array of technologies into an apparatus and method consisting of software, routines, procedures, and hardware that are used in an industrial process (e.g., a nuclear power plant) to verify instrument calibration and response time, measure vibration of process components, identify process anomalies, and provide a means to determine when an instrument must be replaced or when the process needs corrective maintenance. Various embodiments of the invention include one or more of the following technologies: on-line monitoring of instrument calibration drift; noise analysis monitoring the response time of instruments, identifying blockages in pressure sensing lines, determining fluid flow rate, and detecting process problems by cross correlation of existing pairs of signals; loop current step response (LCSR) technique identifying a value for the response time of resistance temperature devices (RTDs) and thermocouples if it is determined by the noise analysis technique that the response time is degraded; time domain reflectometry and cable impedance measurements to identify problems in cables, connectors, splices, and the end device (these measurements include loop resistance, insulation resistance, inductance, and capacitance measurements and are collectively referred to as LCR measurements); cross calibration techniques to determine whether a group of temperature sensors have lost their calibration, provide new calibration tables for outliers, and identify the sensors that must be replaced; and empirical techniques to identify fouling of venturi flow elements.

FIG. 1 illustrates an embodiment of the integrated system 10. Numerous plant sensors 102a, 102b, . . . 102n each provide a signal to a signal conditioning module 104a, 104b, . . . 104n, to an analog-to-digital converter (ADC) 106a, 106b, . . . 106n, and into a computer 110. The computer 110 provides data to a recorder 114 and a display/controller 112. The display/controller 112 communicates with the computer 110 to confirm and initiate actions by the computer 110. The computer 110 also provides data to a multiplexer (MUX) 122 and a calibration/test signal module 120, which also is connected to the MUX 122. The MUX 122 provides a calibration or test signal to a sensor 102a, 102b, . . . 102n, as determined by the computer 110, for testing the loop or the sensor 102a, 102b, . . . 102n.

As illustrated, the integrated system 10 performs on-line monitoring and in situ testing of sensors 102a, 102b, . . . 102n installed in an industrial plant, for example, a power plant or a manufacturing plant. On-line monitoring involves recording and plotting the steady-state output of sensors, or instruments, during plant operation to identify the condition of the sensor and the process, including drift. For redundant instruments, drift is identified by comparing the readings of the redundant instruments to distinguish between process drift and instrument drift. For non-redundant instruments, process empirical modeling using neural networks or other techniques and physical modeling are used to estimate the process and use it as a reference for detecting instrument drift. Process modeling is also used with redundant instruments to provide added confidence in the results and account for common mode, or systemic, drift. This is important because some generic problems cause redundant instruments to all drift together in one direction.

The sensors 102a, 102b, . . . 102n, in one embodiment, include transmitters monitoring various processes. These transmitters include, but are not limited to, pressure transmitters, flow transmitters, temperature transmitters. In another embodiment, the sensors 102a, 102b, . . . 102n include instrument loops in which the signal is derived from an instrument monitoring a process variable. In still another embodiment, the sensors 102a, 102b, . . . 102n include smart sensors that provide a digital signal to the remainder of the loop. In this embodiment, the computer 110 of the integrated system 10 receives the digital signal directly from the sensors 102a, 102b, . . . 102n without having the signal pass through an ADC 106a, 106b, . . . 106n.

In one embodiment, the integrated system 10 is an adjunct to the normal plant instrumentation system. That is, the integrated system 10 works in conjunction with the normal, installed plant instrumentation to provide on-line calibration and testing capabilities in addition to the normal monitoring and control functions of the instruments. Toward that end, the connection to plant sensors 102a, 102b, . . . 102n are made by tapping into the loop signals. For example, with a standard 4-20 milliampere current loop, a resister is added to the loop and the voltage across the resistor is used as the input to the signal conditioning module 104a, 104b, . . . 104n. In a nuclear power plant, either the signal conditioning module 104a, 104b, . . . 104n or another module provides isolation between the safety related sensor and the integrated system 10.

In another embodiment of the integrated system 10, multiple plant sensors 102a, 102b, . . . 102n are connected to an input multiplexer that feeds an ADC that inputs a digital signal to the computer 110. The input multiplexer is an alternative to the plurality of ADCs 106a, 106b, . . . 106n illustrated in FIG. 1. In still another embodiment of the integrated system 10, the digital signals representing the sensor values are obtained from a plant computer, which is monitoring the plant sensors 102a, 102b, . . . 102n for other purposes, such as operation and control of the plant.

Figure 2:
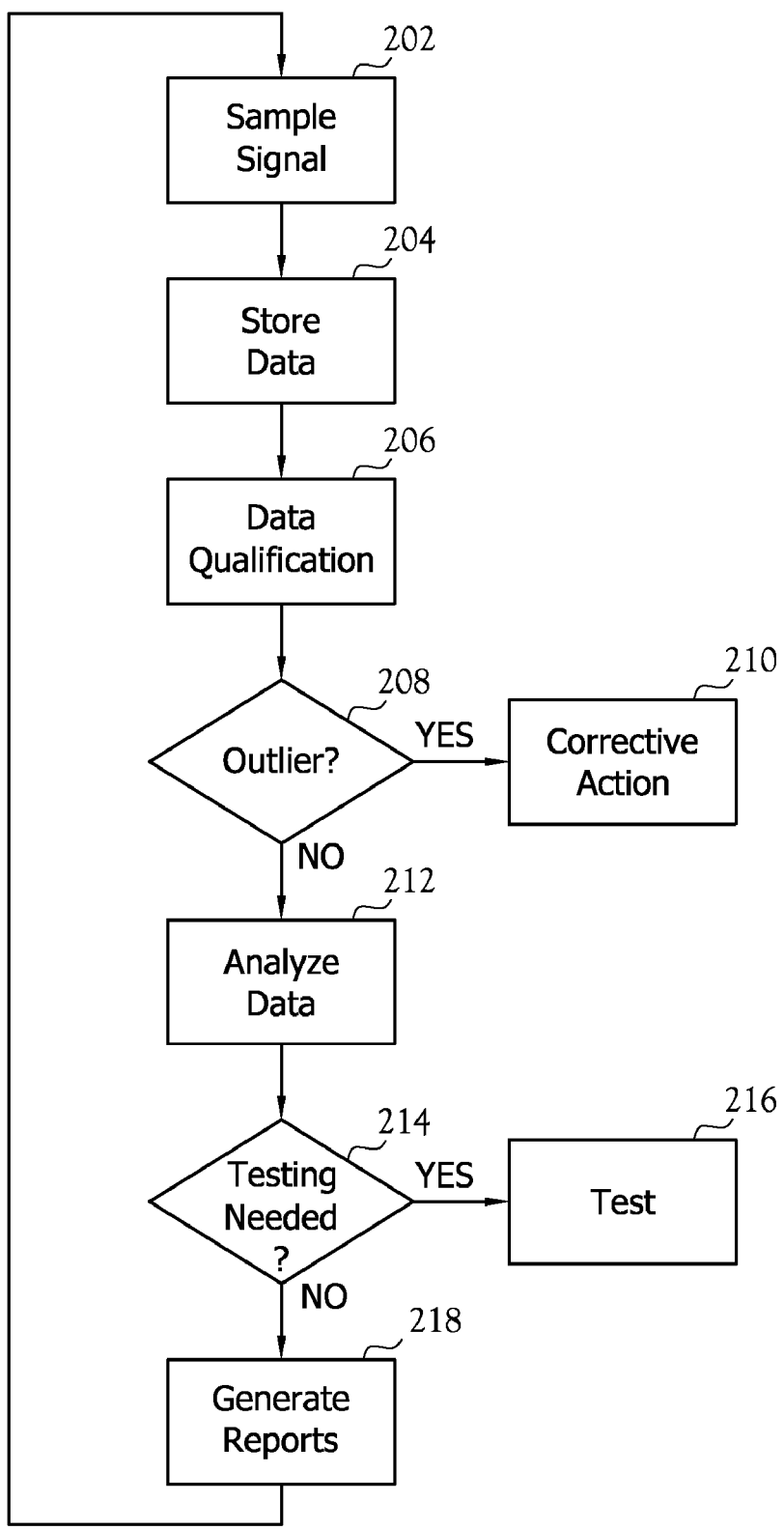
FIG. 2 is a flow diagram of the steps for processing the signals from one sensor.

FIG. 2 illustrates a flow diagram of the integrated system 10 for a single sensor 102a, 102b, . . . 102n. The signal from a sensor 102a, 102b, . . . 102n is sampled 202 and the sample data is stored 204. The sampled data is screened with data qualification 206 to determine whether the data indicates an outlier, or bad data, 208. If an outlier is indicated, corrective action 210 is determined to be necessary. If an outlier is not indicated, then the data is analyzed 212. The results of the analysis will indicate whether testing is needed 214. If testing is indicated, the appropriate test 216 is performed, otherwise, the data collection process is repeated by continuing to sample the signal 202. In one embodiment, the results of the analysis 212, after determining that testing is not needed 214, are generated 218 as plots, bar charts, tables, and/or reports, which are displayed for the operator and recorded for future reference. In another embodiment, the results of the analysis 212 are generated 218 before the testing determination 214. In still another embodiment, the results of the analysis 212 are generated 218 at periodic intervals.

Sampling the signal 202 includes sampling the signals from the output of instruments in a manner which would allow one to verify both the static calibration and dynamic response time of instruments and the transient behavior of the process itself. Sampling the signal 202 occurs at a sampling frequency that is between direct current (dc) up to several kilohertz. In one embodiment, a single sensor 102a, 102b, . . . 102n has two signal conditioning modules 104a, 104b, . . . 104n and two ADCs 106a, 106b, . . . 106n providing two digital signals to the computer 110. One ADC 106a, 106b, . . . 106n samples the dc component of the sensor signal, which provides the data for static calibration analysis, including drift. The other ADC 106a, 106b, . . . 106n samples at rates up to several thousand times per second, which provides the data for dynamic response analysis, including the noise analysis and process transient information. In another embodiment, a single ADC 106a, 106b, . . . 106n samples at rates up to several thousand times per second and the computer 110 stores two data streams, one for static calibration analysis and another for dynamic response analysis, vibration measurements and detection of other anomalies.

In one embodiment, storing the data 204 includes storing the sample data in random access memory (RAM) in the computer 110. In another embodiment, storing the data 204 includes storing the sample data in a permanent data storage device, such as a hard disk, a recordable compact disk (CD), or other data storage media.

In one embodiment, the data qualification 206 includes screening the data using data qualification algorithms to remove bad data. In another embodiment, the data qualification 206 includes screening the data to determine whether a sensor value is an outlier 208. If a sensor value is determined to be an outlier 208, corrective action 210 is taken or initiated. In one embodiment, the corrective action 210 includes alarming the condition, which alerts an operator so that corrective action can be taken. In another embodiment, corrective action 210 includes initiating in situ testing, such as response time testing, or calibration. For example, if the sensor 102a, 102b, . . . 102n is an RTD, the corrective action 210 includes one or more of the following in situ tests: LCSR, TDR, cable impedance measurements, and cross calibration. Cross calibration is performed at several temperatures to verify the calibration of RTDs over a wide temperature range and to help produce a new resistance versus temperature table for an outlier. In one embodiment, one or more of the in situ tests are performed by the integrated system 10. In one embodiment, the tests are performed automatically based on rules established by the programming. In another embodiment, the tests are performed after the condition is alarmed to the operator and the operator approves the test to be run.

The data qualification 206, in one embodiment, scans and screens each data record to remove any extraneous effects, for example, artifacts such as noise due to interference, noise due to process fluctuations, signal discontinuities due to maintenance activities and plant trips, instrument malfunctions, nonlinearities, and other problems.

If the sensor data is not an outlier, the data is analyzed 212 and analysis results are produced. The data analysis 212 performed is dependent upon the data that is sampled and how it is sampled. Data analysis 212 involves using available data to estimate and track the process variable/value being measured. The process value estimate is then used to identify the deviation of each instrument channel from the process value estimate. A variety of averaging and modeling techniques are available for analysis of on-line monitoring data for instrument calibration verification. More reliable results are achieved when three or more of these techniques are used together to analyze the data and the results are averaged. The uncertainties of each technique must be evaluated, quantified, and properly incorporated in the acceptance criteria. The data analysis 212 includes, but is not limited to, static analysis, dynamic response analysis, and transient process analysis. Static analysis includes the process analysis illustrated in FIG. 3 and the drift analysis illustrated in FIG. 8. Dynamic response analysis includes the noise analysis illustrated in FIGS. 4 to 7 and 18. In another embodiment, the dynamic response analysis includes the time domain reflectometry analysis illustrated in FIGS. 9 and 13. In still another embodiment, the dynamic response analysis includes the analysis of amplitude probability density illustrated in FIGS. 14 to 17.

The analysis results are used to determine whether testing is needed 214. If so determined, appropriate tests 216 are performed. In one embodiment, these tests 216 are the same as identified above with respect to the corrective action 210. If testing 216 is not required, the process repeats by taking another sample 202.

In one embodiment, each of the functions identified in FIG. 2 are performed by one or more software routines run by the computer 110. In another embodiment, one or more of the functions identified in FIG. 2 are performed by hardware and the remainder of the functions are performed by one or more software routines run by the computer 110. In still another embodiment, the functions are implemented with hardware, with the computer 110 providing routing and control of the entire integrated system 10.

The computer 110 executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function.

Figure 3:
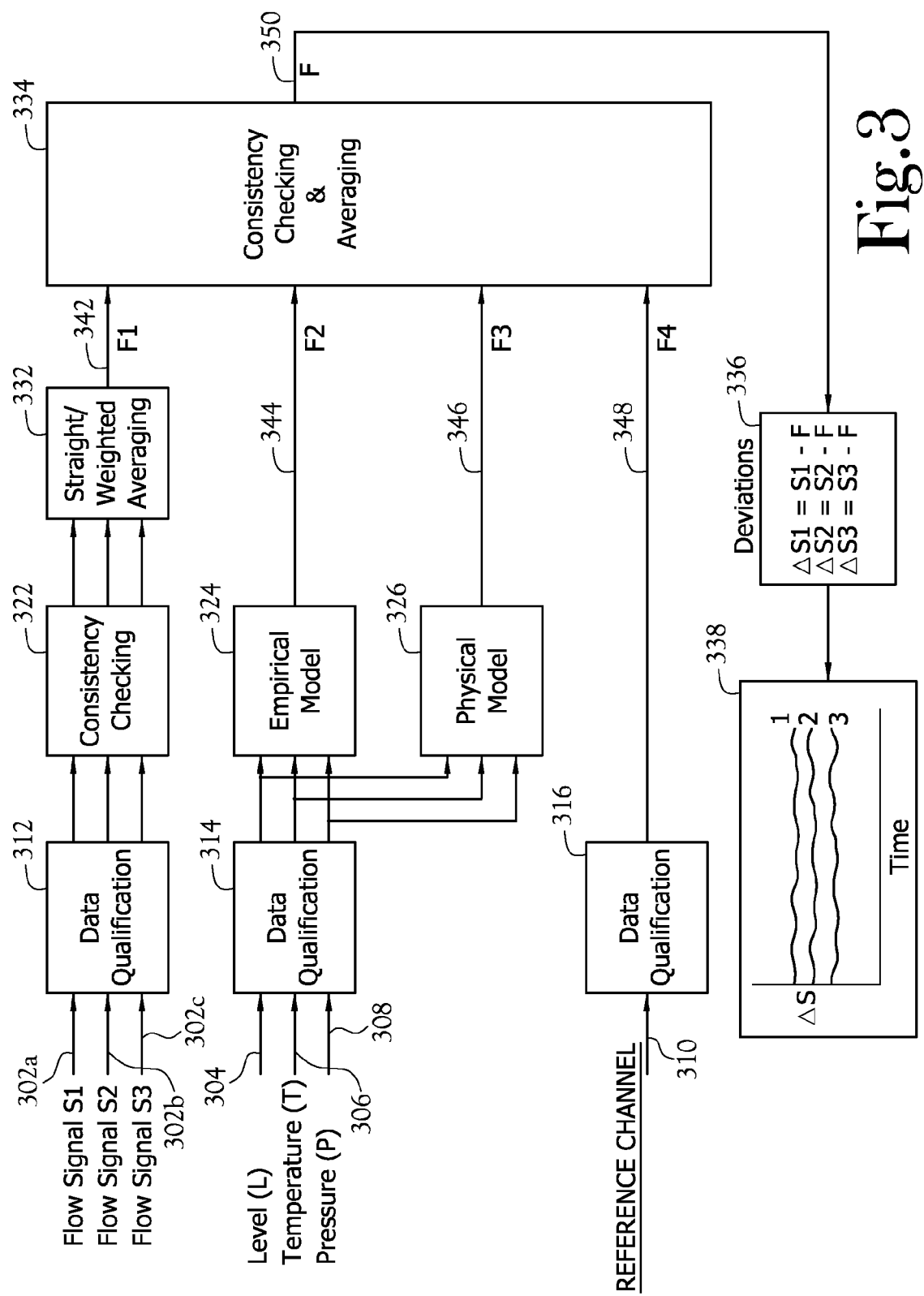
FIG. 3 is an block diagram of one embodiment of on-line monitoring of redundant flow signals.

FIG. 3 illustrates one embodiment of on-line monitoring of redundant flow signals. Those skilled in the art will recognize that the input sensors can be of other plant variables, such as pressure, temperature, level, radiation flux, among others, without departing from the spirit and scope of the present invention. The illustrated on-line monitoring system uses techniques including averaging of redundant signals 302a, 302b, 302c (straight and/or weighted averaging 332), empirical modeling 324, physical modeling 326, and a calibrated reference sensor 310. The raw data 302a, 302b, 302c, 304, 306, 308, 310 is first screened by a data qualification algorithm 312, 314, 316 and then analyzed 322, 324, 326, 332, 334 to provide an estimate 350 of the process parameter being monitored. In the case of the averaging analysis, the data is first checked for consistency 322 of the signals. The consistency algorithm 322 looks for reasonable agreement between redundant signals. The signals that fall too far away from the other redundant signals 302a, 302b, 302c are excluded from the average or weighted average 342. In other embodiments, one or more of the reference methods are used with the exclusion of the others. For example, in one embodiment, if an empirical model 324 has not been developed for the process variable being measured, but a physical model 326 has been developed, the process value 342 developed through straight or weighted averaging 332 and the process value 346 determined by the physical model 332 are used.

The diverse signals, which in the illustrated embodiment include level (L) 304, temperature (T) 306, and pressure (P) 308, are process measurements that bear some relationship to the process flow 302a, 302b, 302c, which is the measured variable. The diverse signals 304, 306, 308 are used in an empirical model 324 to calculate the process flow 344 based on those variables 304, 306, 308. The diverse signals 304, 306, 308 are also used in a physical model 326 to calculate the process flow based on those variables 304, 306, 308. The flow value (F2) 344 derived from the empirical model 324 and the flow value (F3) 346 derived from the physical model 326, along with the straight or weighted average flow (F1) 342 and the reference flow (F4) 348, are checked for consistency and averaged 334 to produced a best estimate of the process flow (F) 350, which is used to calculate deviations 336 of the flow signals 302a, 302b, 302c from the best estimate (F) 350. The deviations 336, provide an output of the signals' 302a, 302b, 302c performance, which, in one embodiment, is represented by a graph 338. In another embodiment, the output is used to determine whether testing 214 is required.

The reference channel 310 is one channel of the group of redundant sensors in which the process signals, such as the flow signals 302a, 302b, 302c, are a part. Upon evaluating historical data, biases may inherently be in the data as compared to the reference values. These biases can be due to normal calibration differences between instruments, different tap locations, etc. To build confidence in and reconfirm the reference for these comparisons, one of the redundant channels 310 should be manually calibrated on a rotational basis so that all redundant channels 302a, 302b, 302c, 310 are manually calibrated periodically. If redundant channels 302a, 302b, 302c are not available, then an accurate estimate of the process parameter from analytical techniques 324, 326 are used to track the process and distinguish instrument drift from process drift.

A process parameter cannot usually be simply identified from measurement of another single parameter. For example, in physical modeling 326, complex relationships are often involved to relate one parameter to others. Furthermore, a fundamental knowledge of the process and material properties are often needed to provide reasonable estimates of a parameter using a physical model 326. Typically, empirical models 324 use multiple inputs 304, 306, 308 to produce a single output 344 or multiple outputs. In doing this, empirical equations, neural networks, pattern recognition, and sometimes a combination of these, and other, techniques, including fuzzy logic, for data clustering are used.

The on-line monitoring illustrated in FIG. 3 identifies calibration problems at the monitored point, that is, under the normal process operating conditions. During normal operations, the monitored point is relatively constant, accordingly, the illustrated embodiment is a one-point calibration check during steady state conditions. When the process is started up or shut down, the process variables change and the on-line monitoring verifies the calibration over the range that the variable changes under the varying process conditions. When data is taken for a wide operating range, extrapolation is used to verify instrument performance above and below the operating range.

The data qualification 312, 314, 316, the consistency checking 322, the empirical model 324, the physical model 326, the straight or weighted averaging 332, the consistency checking and averaging 334, and the deviations 336, in one embodiment, are implemented with software routines running on at least one computer 110. In another embodiment, the functions are implemented with a combination of hardware and software.

Figure 4:
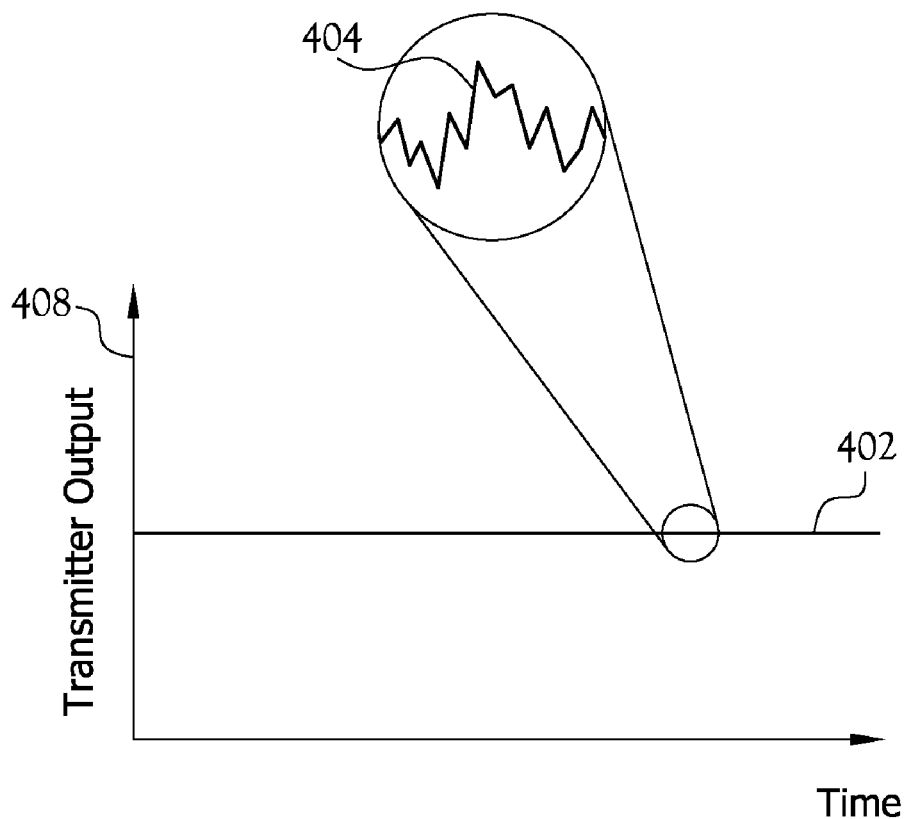
FIG. 4 is diagram showing a noise component of a sensor signal.

FIGS. 4 through 7 illustrate noise analysis. FIG. 4 shows a waveform of a sensor signal 402 plotted as the sensor output 408 versus time 410. Over a long period with the process held stable, the sensor signal 402 appears as a dc signal, which has a relatively constant signal level, commonly called steady state value or the dc value. However, if a portion of the signal 402 is examined for a short period with a fast sampling rate, a varying signal 404 is seen. That is, there are natural fluctuations that normally exist on the output of sensors while the process is operating.

The varying signal 404 is the noise or alternating current (ac) component of the signal and originates from at least two phenomena. First, the process variable being measured has inherent fluctuations due to turbulence, random heat transfer, vibration, and other effects. Secondly, there are almost always electrical and other interferences on the signal. Fortunately, the two phenomenon are often at widely different frequencies and can thus be separated by filtering. The two types of noise must be separated because the fluctuations that originate from the process are used in performing the noise analysis, which is used for sensor and process diagnostics, response time testing of the sensor, vibration measurement of plant components, among other uses.

Figure 5:
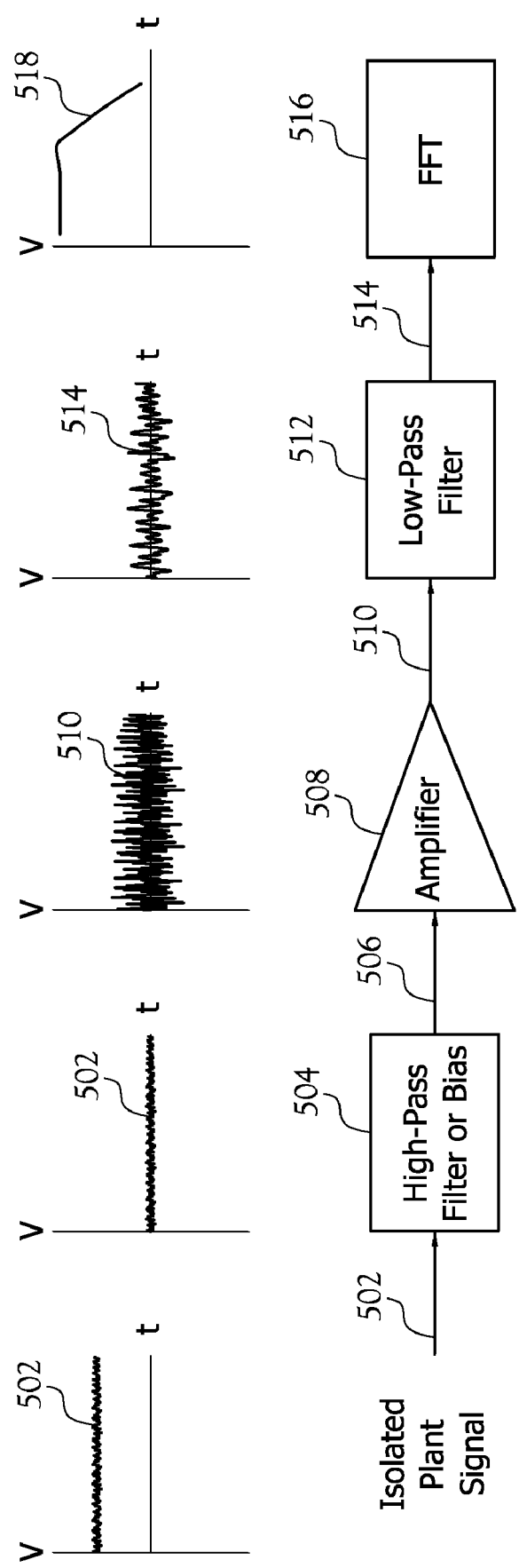
FIG. 5 is a block diagram of one embodiment of noise analysis monitoring showing waveforms at various points.

FIG. 5 illustrates one embodiment of noise analysis monitoring showing waveforms at various points along the process. A sensor signal 502 has a wave dc component and a noise component. A high-pass filter or bias 504 removes the dc component, leaving only the noise component 506. The noise component 506 is amplified 508 to produced an amplified signal 510, which is passed through a low-pass filter 512 to produce a process noise signal 514, which does not contain electrical noise. There are various methods available for the analysis of the process noise signal 514. One option is referred to as the frequency domain analysis, which can be implemented with a Fast Fourier Transform (FFT), and another is called the time domain analysis. The illustrated embodiment analyses the process noise signal 514 with an FFT 516 to produce a power spectral density (PSD) plot 518. In another embodiment, the process noise signal 514 is analyzed in the time domain, with autoregressive (AR) modeling being one example. An AR model is a time series equation to which the noise data 514 is fit and the model parameters are calculated. These parameters are then used to calculate the response time of a sensor or provide other dynamic analysis.

Figure 6:
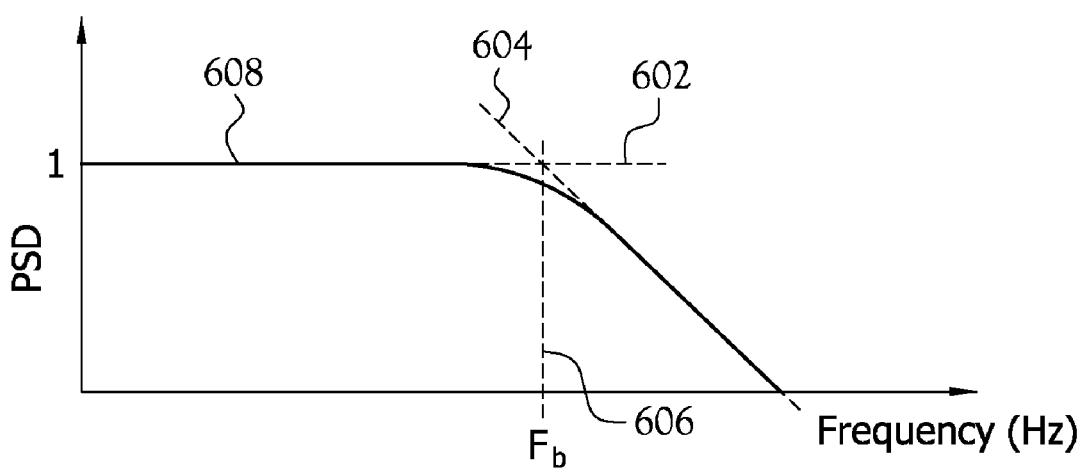
FIG. 6 is an ideal power spectrum density (PSD) graph.

FIG. 6 illustrates an ideal PSD, which is a variance of a signal in a small frequency band as a function of frequency plotted versus frequency. For a simple first order system, the PSD is all that is needed to provide a sensor response time, which is determined by inverting the break frequency (Fb) 606 of the PSD. The break frequency 606 is the intersection of a line 602, which forms the flat portion of the curve 608, with a line 604, which follows the slope of the trailing portion. The ideal PSD of FIG. 6 does not show any resonances or other process effects that may affect the response time determination or other sensor or process diagnostics.

Figure 7:
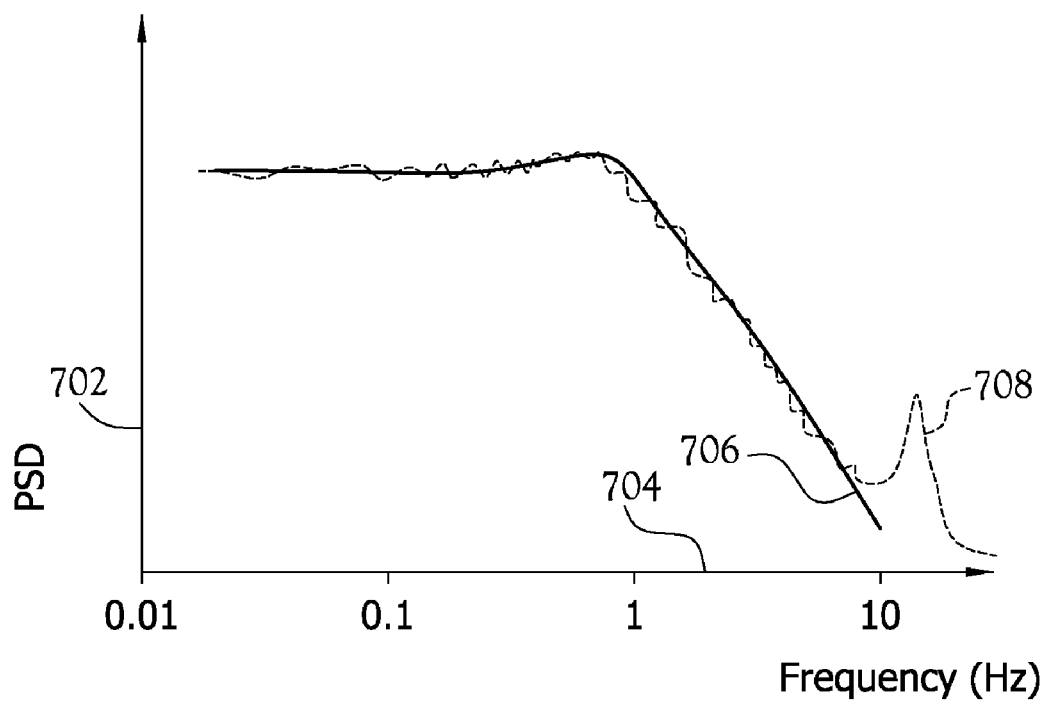
FIG. 7 is a representative power spectrum density (PSD) graph.

FIG. 7 illustrates a representative PSD which shows a resonance and illustrates how an actual PSD might deviate from the ideal curve 608. A PSD 708 is determined for a sensor and the PSD amplitude 702 is plotted versus frequency 704. The solid line 706 is a smoothed trace of the calculated PSD 708, which contains artifacts that deviate from the ideal.

Impulse lines are the small tubes which bring the process signal from the process to the sensor for pressure, level, and flow sensors. Typically, the length of the impulse lines are 30 to 300 meters, depending on the service in the plant, and there are often isolation valves, root valves, snubbers, or other components on a typical impulse line. The malfunction in any valve or other component of the impulse line can cause partial or total blockage of the line. In addition, impulse lines can become clogged, or fouled, due to sludge and deposits that often exist in the process system. The clogging of sensing lines can cause a delay in sensing a change in the process pressure, level, or flow. In some plants, sensing line clogging due to sludge or valve problems has caused the response time of pressure sensing systems to increase from 0.1 seconds to 5 seconds. Clogged sensing lines can be identified while the plant is on-line using the noise analysis technique. Basically, if the response time of the pressure, level, or flow transmitter is measured with the noise analysis technique (as illustrated in FIG. 7) and compared to a baseline value, the difference includes any delay due to the sensing line length and any blockages, voids, and other restrictions.

Figure 8:
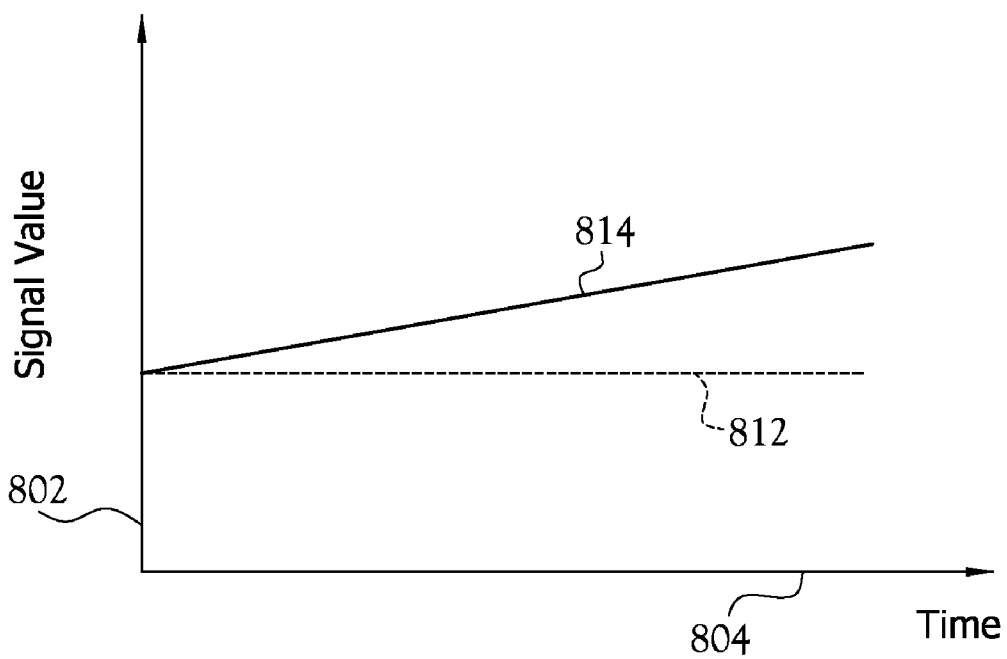
FIG. 8 is graph of a sensor experiencing drift over a period of time.

FIG. 8 illustrates sensor drift by plotting the amplitude 802 of a drifting sensor signal 814 versus time 804. FIG. 8 also illustrates a non-drifting sensor signal 812 over the same period. Sensor drift is the change in the steady state value over time of the sensor for a constant process value. Typically, sensor drift is detected by trending sensor values over a period and comparing the measured values to a known or estimated value.

Sensor, or instrument, drift is characterized as either zero shift or span shift, or a combination of the two. Zero shift drift occurs when a sensor output is shifted by an equal amount over the sensor's entire range. Span shift drift occurs when a sensor output is shifted by an amount that varies over the sensor's range. Process drift occurs when the process being measured drifts over time.

To separate sensor drift from process drift or to establish a reference for detecting drift, a number of techniques are used depending on the process and the number of instruments that can be monitored simultaneously. For example, if redundant instruments are used to measure the same process parameter, then the average reading of the redundant instruments is used as a reference for detecting any drift. In this case, the normal output of the redundant instruments are sampled and stored while the plant is operating. The data are then averaged for each instant of time. This average value is then subtracted from the corresponding reading of each of the redundant instruments to identify the deviation of the instruments from the average. In doing so, the average reading of the redundant instruments is assumed to closely represent the process. To rule out any systematic (common) drift, one of the redundant transmitters is calibrated to provide assurance that there have been no calibration changes in the transmitter. Systematic drift is said to occur if all redundant transmitters drift together in one direction. In this case, the deviation from average would not reveal the systematic drift.

Another approach for detecting systematic drift is to obtain an independent estimate of the monitored process and track the estimate along with the indication of the redundant instruments. This approach is illustrated in FIG. 3, which is an embodiment using redundant flow signals, although other process variables are monitored in other embodiments. A number of techniques may be used to estimate the process. These may be grouped into empirical and physical modeling techniques. Each technique provides the value of a process parameter based on measurement of other process parameters that have a relationship with the monitored parameter. For example, in a boiling process, temperature and pressure are related by a simple model. Thus, if temperature in this process is measured, the corresponding pressure can be determined, tracked, and compared with the measured pressure as a reference to identify systematic drift. This approach can also be used to provide a reference for detecting drift if there is no redundancy or if there is a need to add to the redundancy. With this approach, the calibration drift of even a single instrument can be tracked and verified on-line.

Figure 9:
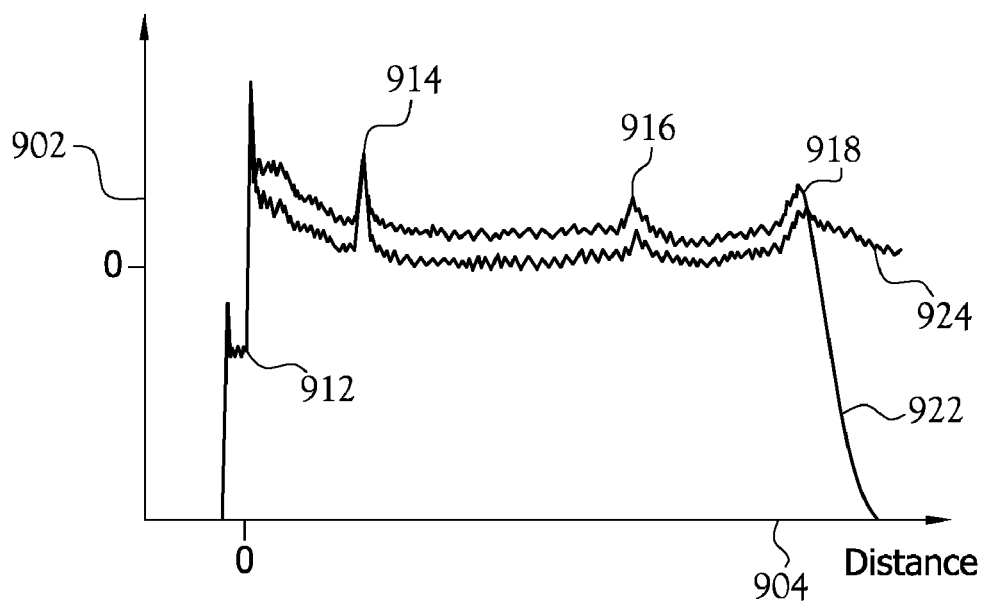
FIG. 9 is a graph of a time-domain-reflectometry (TDR) trace for a sensor and its cable.
Figure 13:
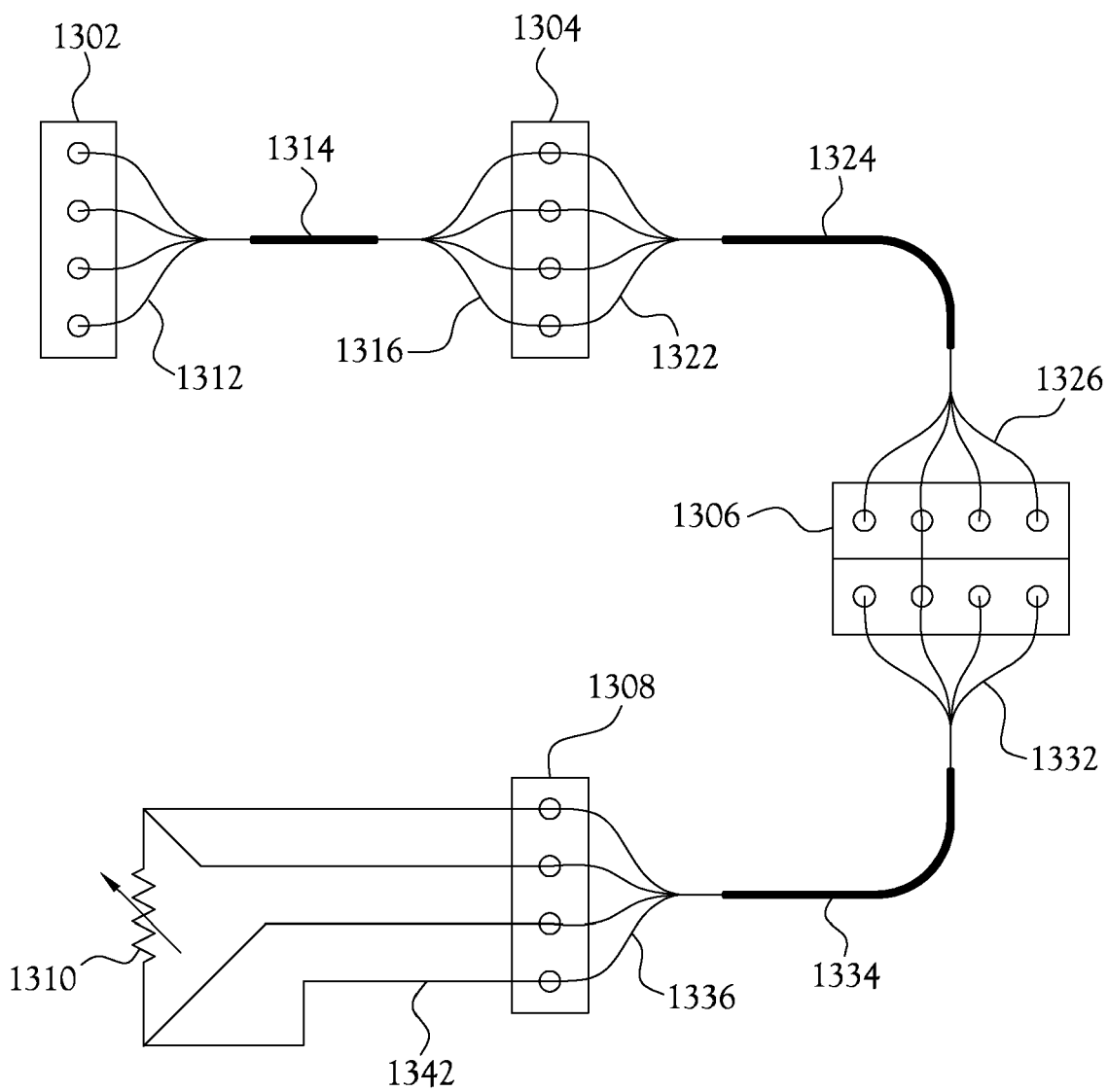
FIG. 13 is a wiring diagram of one embodiment of a RTD connection tested with a TDR as illustrated in FIG. 9.

FIG. 9 illustrates a graph of a time-domain-reflectometry (TDR) trace for a sensor, or end device, 1310 and its cable 1314, 1324, 1334. FIG. 13 illustrates a wiring diagram of one embodiment of a four-wire resistance temperature detector (RTD) 1310 circuit tested with a time domain reflectometer as illustrated in FIG. 9. The RTD circuit includes a connection terminal block 1302 connected to a second terminal block 1304 via cable 1314. The cable 1314 includes four conductors 1312, 1316 at each end connected to the respective terminal blocks 1302, 1304. The second terminal block 1304 is connected to an outside terminal block at a wall penetration 1306, which has an inside terminal block that is connected to a third terminal block 1308 by cable 1334. The cables 1324, 1334 each include four conductors 1322, 1326, 1332, 1336 at each end connected to the respective terminal blocks 1304, 1306, 1308. The third terminal block 1308 is connected to the four leads 1342 of the RTD 1310. The TDR trace of FIG. 9 is plotted as a reflection coefficient 902 versus distance 904 from the test point 912 made at the terminal block 1302. The TDR traces 922, 924 show the locations along a cable 1314, 1324, 1334 where the cable impedance changes. The TDR traces 922, 924 of FIG. 9 graph the test results for a first pair of conductors 922 and a second pair of conductors 924. The TDR traces 922, 924 show peaks for cable discontinuities for two pairs of conductors for a remote shutdown panel 914, a wall penetration 916, and the instrument 918, which can be an RTD or other sensor or instrument. The discontinuities include joining two cables 1314, 1324, 1334 together, such as at a terminal block 1302, 1304, 1306, 1308, which in FIG. 9 correspond to the shutdown panel 914, the wall penetration 916, and the instrument 918. The trace 922 for one pair has a short as indicated by the drastic drop downwards at one point 918. The trace 924 for the other pair appears to be a good cable pair without fault because the trace 924 does not turn drastically downward, indicating a short, nor does the trace 924 turn upwards, indicating an open circuit. The TDR traces 922, 924 are used as a troubleshooting tool to identify, locate, or describe problems, and establish baseline measurements for predictive maintenance and ageing management. There are electrical tests, mechanical tests, and chemical tests that are used to monitor or determine the condition of cables. The electrical tests, such as the TDR, have the advantage of providing the capability to perform the tests in situ, often with no disturbance to the plant operation. If an RTD is also tested using the LCSR, noise analysis, and/or self-heating methods, the combined data greatly enhances the diagnostic capability to identify the cause of a signal anomaly from such a circuit. This is especially true if the measurements have been performed on the circuit in the past and baseline information is available to identify changes from a reference condition when everything was new or normal. The electrical tests are not restricted to TDR measurements. In particular, measurement of resistance (R), capacitance (C), and inductance (L), commonly referred to as LCR testing, significantly enhances cable diagnostics capability, particularly when combined with TDR measurements For example, RTD circuits that have shown erratic behavior have been successfully tested by the TDR method to give the maintenance crew proper directions as to the location of the problem. The TDR technique is also helpful in troubleshooting motor and transformer windings, pressurizer heater coils, nuclear instrumentation cables, thermocouples, motor operated valve cables, etc. To determine the condition of cable insulation or jacket material, in addition to TDR, electrical parameters such as insulation resistance, dc resistance, ac impedance, and series capacitance are measured.

Figure 10:
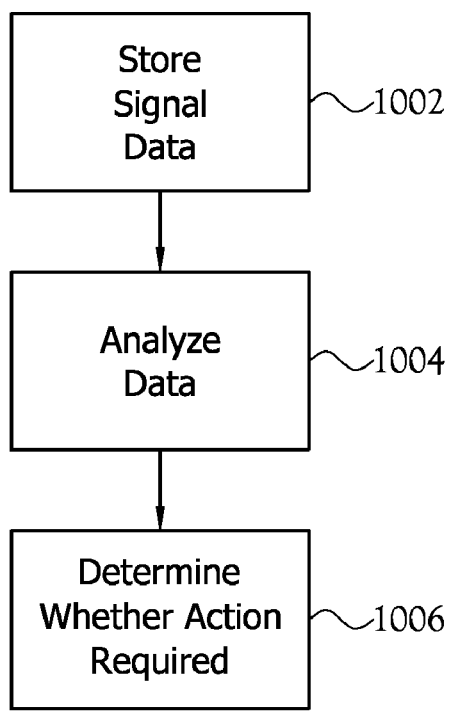
FIG. 10 is a flow diagram of one embodiment for analyzing the data.

FIG. 10 is a flow diagram of one embodiment of functions performed by the integrated system 10. The signal data is stored 1002 as a first step. After storing signal data 1002, the data is analyzed 1004. The results of the analysis 1004 are used to determine whether action is required 1006 to further test or correct a found condition. In one embodiment, storing the signal data 1002 is performed by the computer 110 through a routine.

The data analysis 1004, in one embodiment, is performed by the computer 110 through one or more routines. For example, the on-line monitoring illustrated in FIG. 3 is performed by software run by the computer 110. Also, the noise analysis and drift analysis are performed by software run by the computer 110. One or more of these analysis techniques can be used for each sensor. The data analysis 1004 performed provides information on the performance and health of the monitored instruments and processes.

The results of the data analysis 1004 are used to determine whether action is required 1006. The actions required 1006, in one embodiment, are performed by the computer 110 through one or more routines. The actions required 1006 include one or more of the LCSR, TDR, cable impedance measurements, and cross calibration. Additionally, the actions required 1006, in other embodiments, include alarming an out of tolerance condition and awaiting a response by an operator to continue corrective action. In one embodiment, the corrective action is performed by the integrated system 10. In another embodiment, the corrective action is performed by another system after being identified by the integrated system 10.

Figure 11:
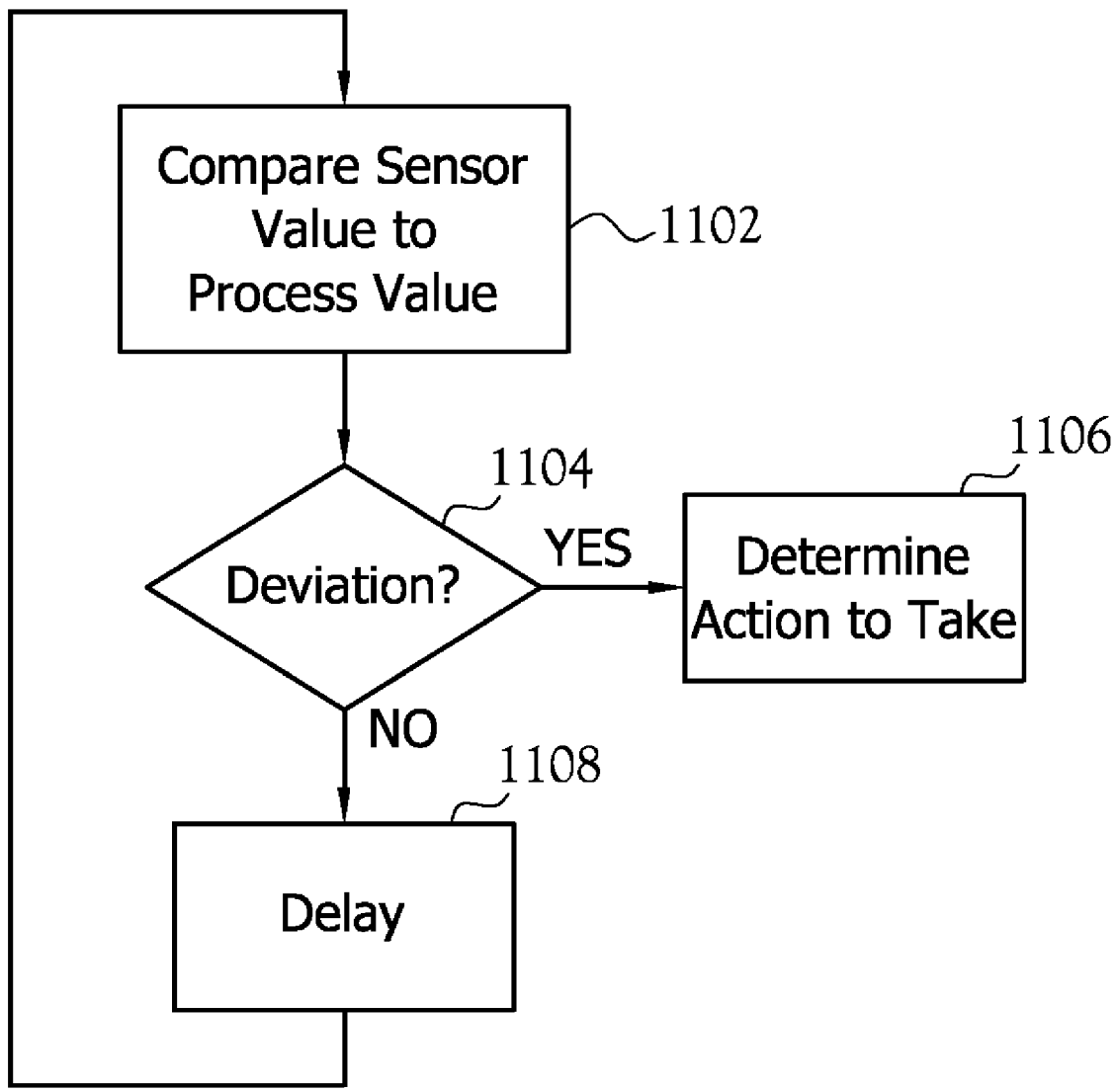
FIG. 11 is a flow diagram for one embodiment of comparing the sensor value to a process value.

FIG. 11 illustrates one embodiment of the data analysis 1004 and determination of whether action is required 1006. A sensor value is compared to a process value 1102 to determine whether there is a deviation 1104 which would require determining an action to take 1106 if the deviation 1104 is actionable. If there is not a deviation 1104, there is, in the illustrated embodiment, a delay 1108 in processing before making the next comparison 1102, thereby completing the loop. In another embodiment, the next comparison 1102 is performed after the deviation determination 1104 without waiting for a defined delay 1108. The process value used for the comparison can be based on an empirical model, on a physical model, on an average of redundant sensor values, or on other techniques or a combination of techniques for determining the process value at the time of the comparison to the measured sensor value.

Figure 12:
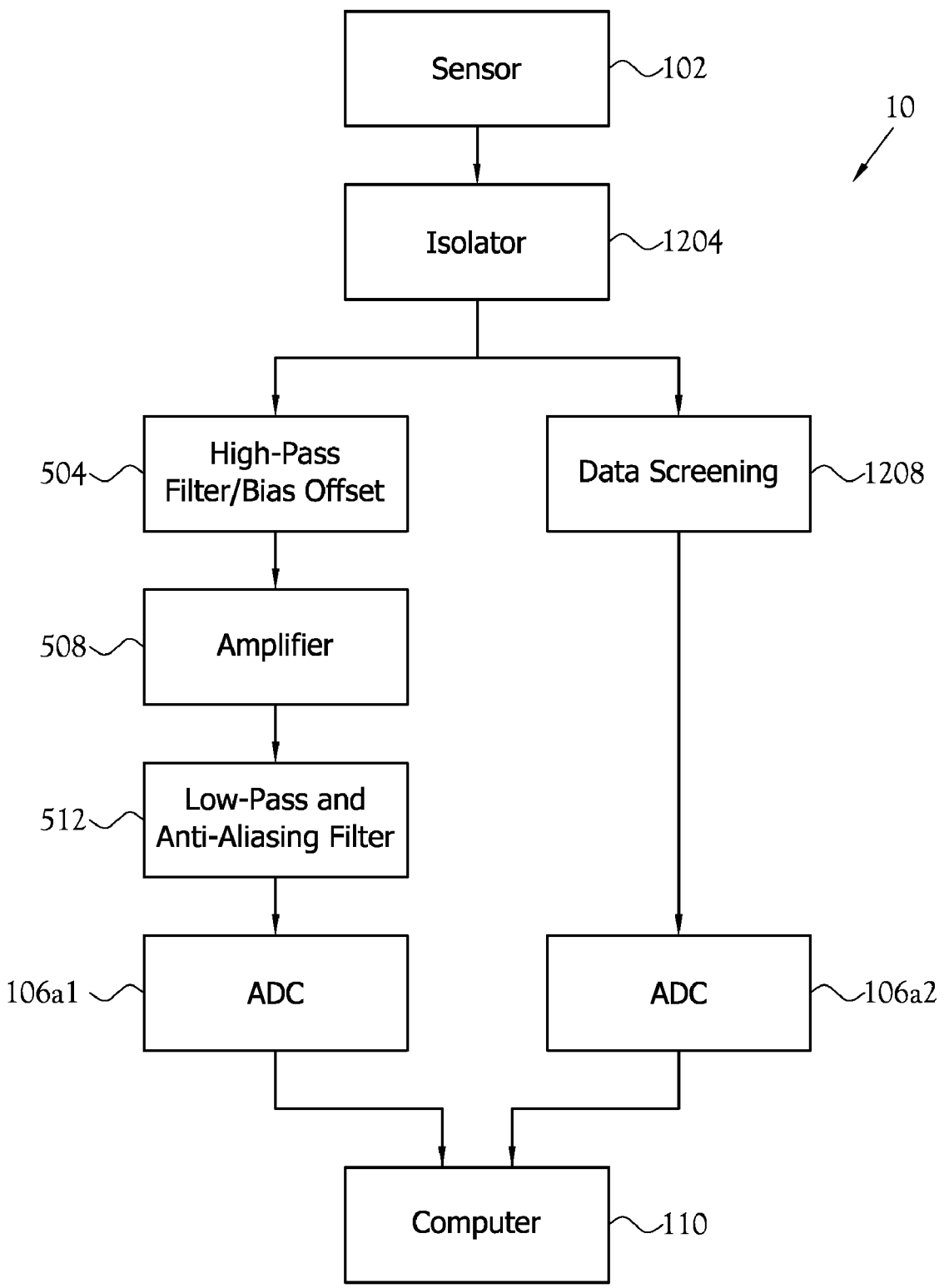
FIG. 12 is a block diagram of an embodiment of one sensor loop.

FIG. 12 illustrates a block diagram of an embodiment of one sensor loop showing a sensor 102 feeding an isolator 1204, which isolates the instrument loop from the integrated system 10 such that the integrated system 10 does not affect the normal operation of the sensor loop. In one embodiment, the isolator 1204 is a resister in the current loop of which the sensor 102 is a part. The voltage across the resistor is the signal provided to the high-pass filter/bias offset module 504 and the data screening module 1208. In another embodiment, the isolator 1204 is a safety related isolation module such as used in a nuclear power plant to isolate safety related components and circuits.

The isolator 1204 provides a signal to a high-pass filter or bias offset 504, an amplifier 508 and a low-pass and anti-aliasing filter 512, which outputs a signal to an ADC 106a1. This ADC 106a1 provides a digital signal suitable for noise analysis. In one embodiment, the low-pass filter 512 provides filtering to remove the electrical noise on the signal from the sensor 102. In another embodiment, the low-pass filter 512 provides anti-aliasing filtering, which reduces the high frequency content of the signal to better enable digital sampling by the ADC 106a1.

The isolator 1204 also provides a signal to a data screening module 1208, which outputs a signal to an ADC 106a2. This ADC 106a2 provides a digital signal suitable for process monitoring and drift analysis. The two ADCs 106a1, 106a2 supply digital signals to the computer 110.

In another embodiment, the signals from the sensor 102 are obtained via a data acquisition circuit. In still another embodiment, the sensor 102 or the isolator 1204 provides a digital output, in which case the ADCs 106a1 to 106a2 are not necessary and the data screening 1208, the filtering 504, 512, and amplification 508 are performed within the computer 110.

The embodiment illustrated in FIG. 12 uses a combination of hardware and software to form the integrated system 10. In one embodiment, each sensor 102a through 102n has at least one ADC 106a to 106n. If the loop requires it, a data screening module 1208 is used to feed the ADC 106a to 106n. Also, if the loop is such that a noise analysis is to be performed, the high-pass filter or bias offset 504, the amplifier 508 and the low-pass and anti-aliasing filter 512 are used and outputs a signal to another ADC 106a1 to 106n1. The computer 110 performs the processing illustrated in FIG. 2. In one embodiment, the corrective action 210 and test 216 functions illustrated in FIG. 2 are performed under computer 110 control through additional circuits communicating with the computer 110 and connected to the sensor 102.

The integrated system 10 is implemented with at least one computer 110. Although not meant to be limiting, the above-described functionality, in one embodiment, is implemented as standalone native code. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM drive) or a floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required steps.

Figure 14:
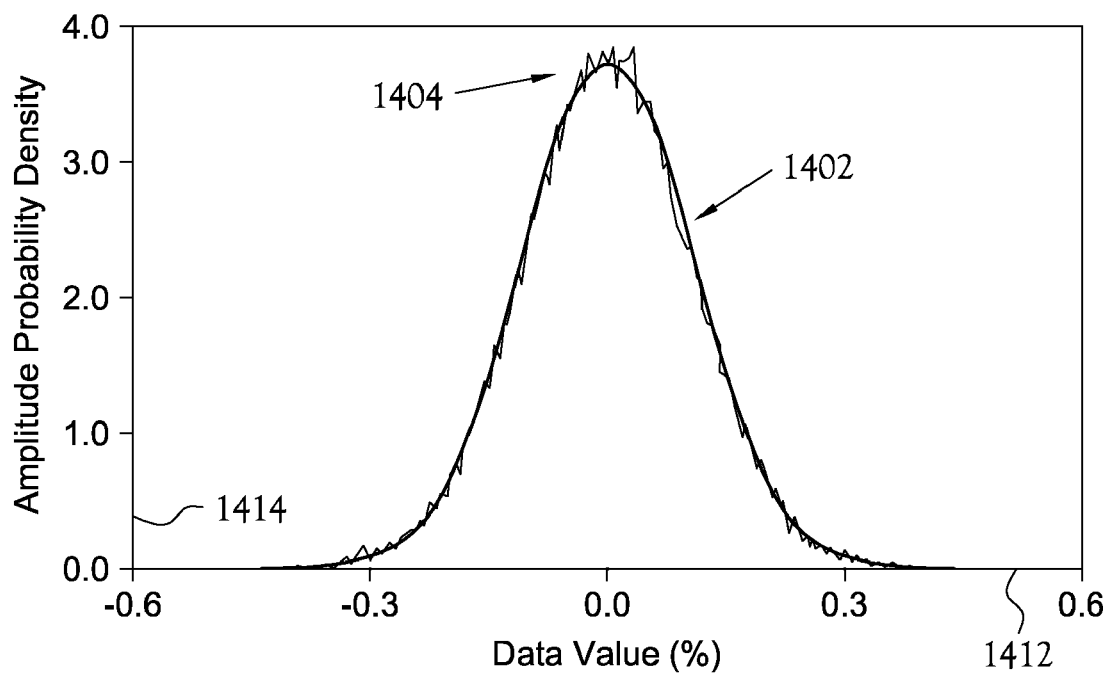
FIG. 14 is an APD graph for a typical normal data distribution.
Figure 15:
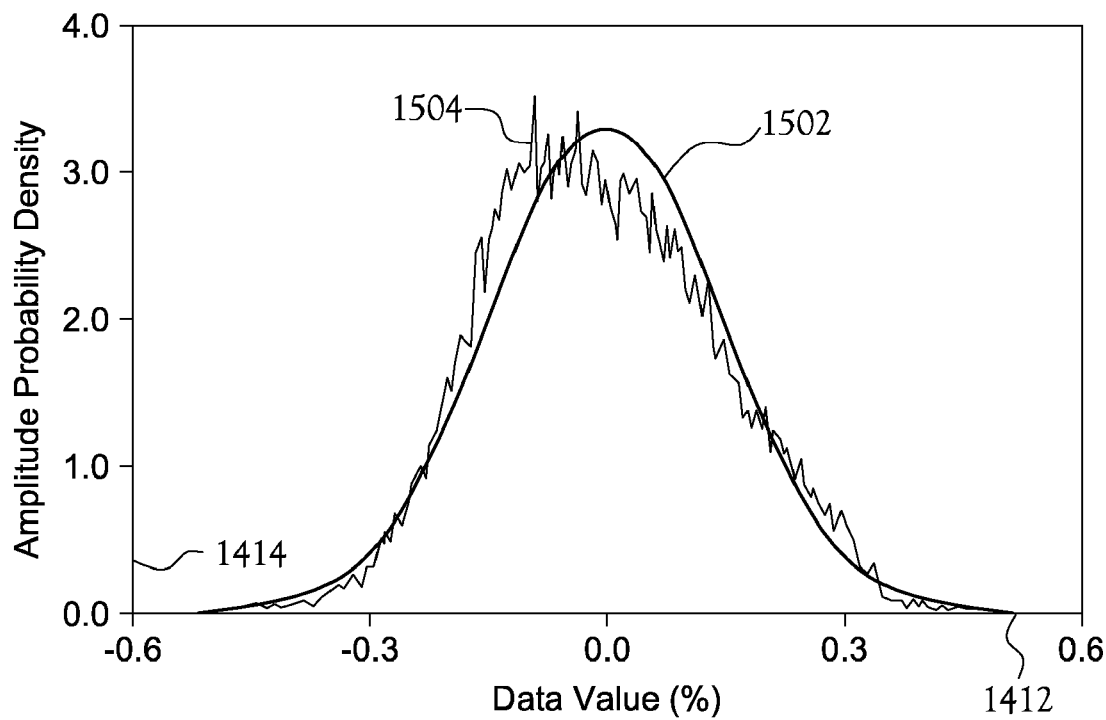
FIG. 15 is an APD graph for a typical skewed data distribution.

FIG. 14 illustrates an Amplitude Probability Density (APD) graph with a typical normal data distribution. FIG. 15 illustrates an APD graph with a typical skewed data distribution. One example where such analysis is useful is in determining the aging condition of neutron detectors in nuclear power plants where problems can occur due to degradation of the detector, its cables, connectors, or a combination of them. In such a case, the TDR, insulation resistance (IR), LCR, and other in-situ cable measurement techniques combined with noise analysis technique increases the diagnostic capability as to the condition of the neutron detector and its associated wiring system. For example, the noise analysis technique is used to identify such dynamic performance indicators as the APD function of the detector noise output, its response time, and other dynamic characteristics to be considered with the cable testing results to improve the capability to determine if the neutron detector system has degraded.

With respect to testing of neutron detectors as end devices, in addition to the noise analysis technique, the pulse response test is available. The response time of a neutron detector is related to the mobility of the ions and electrons in the gas and the driving potential (applied voltage). The response time is approximated as a function of the ion and electron velocity. Stepping, or pulsing, the high voltage applied to the detector, and then measuring the resulting ion and electron velocity, allows the response time to be determined. In other embodiments, this test is performed as a supplement to noise analysis or in lieu of noise analysis.

FIGS. 14 and 15 show APD plots of a sensor noise output for two sensors. Amplitude Probability Density is plotted along the y-axis 1414 and the percent data value is plotted along the x-axis 1412. In FIG. 14, a normal Gaussian distribution curve 1402 is plotted along with the sensor noise output data 1404. As can be seen, the sensor noise output data 1404 closely follows the normal distribution curve 1402, thereby indicating that the sensor is operating normally. In FIG. 15, a normal distribution curve 1502 is plotted along with the sensor noise output data 1504 for a sensor deviating from the norm. As can be seen in FIG. 15, the sensor noise data 1504 does not follow the normal distribution curve 1502, but is skewed to one side of the Gaussian peak. A skewness value is calculated and trended for each sensor to identify the on-set of sensor anomalies and to be able to take corrective action before sensor performance degrades beyond an acceptable point. For a normal sensor (including normal cables), the skewness value should be near zero. As the sensor output becomes anomalous or its cables become defective, the skewness value departs from zero. Skewness is also referred to as the third moment of the output noise data from a sensor; the first moment being the mean value and the second moment being the signal variance. A fourth moment called kurtosis (or flatness) is also used. The kurtosis is a measure of the peakedness of the APD. The sharper the APD peak, the larger the kurtosis value and vice versa.

Figure 16:
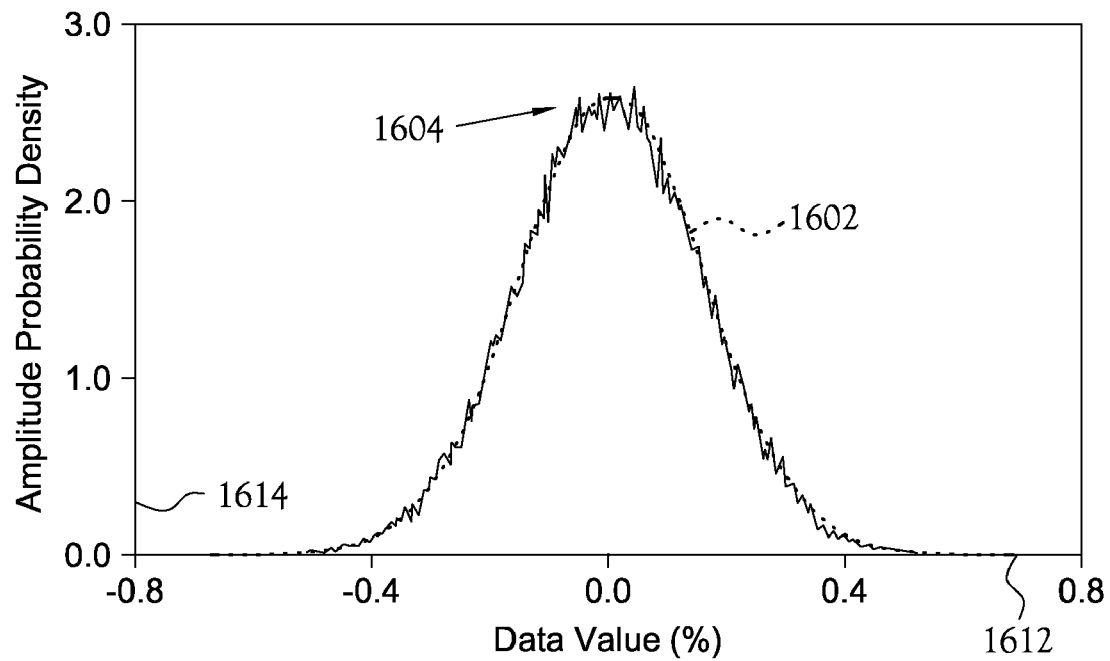
FIG. 16 is an APD graph for a typical normal sensor.
Figure 17:
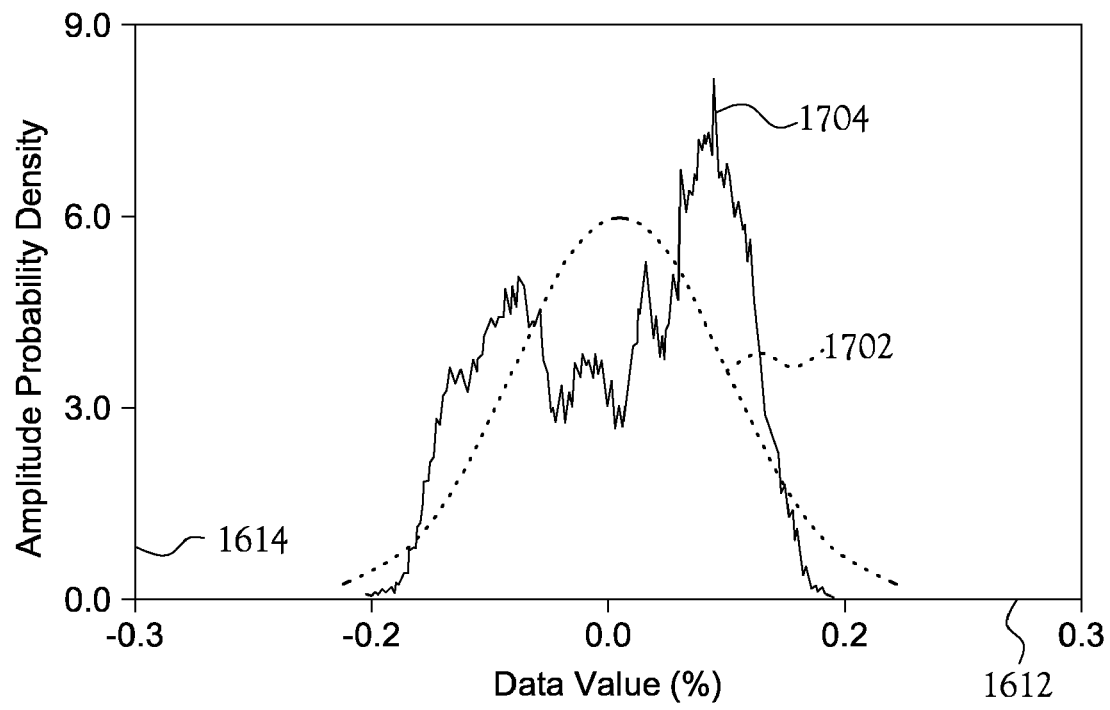
FIG. 17 is an APD graph for a typical defective sensor.

FIG. 16 illustrates an APD graph for a typical normal sensor. FIG. 17 illustrates an APD graph for a typical defective sensor. Amplitude Probability Density is plotted along the y-axis 1614 and the data value is plotted along the x-axis 1612. In FIG. 16, a normal Gaussian distribution curve 1602 is plotted along with the sensor output data 1604. As can be seen, the sensor output data 1604 closely follows the normal distribution curve 1602, thereby indicating that the sensor is operating normally. In FIG. 17, a normal distribution curve 1702 is plotted along with the sensor output data 1704 for a sensor deviating from the norm. As can be seen in FIG. 17, the sensor data 1704 does not follow the normal distribution curve 1702, but deviates drastically from the Gaussian curve 1702. The sensor data 1704 illustrated in FIG. 17 indicates a defective sensor. Cable defects also cause such departures from a normal distribution 1702. As such, APD plots are used not only to detect sensor problems, but also to identify problems in wiring systems.

Figure 18:
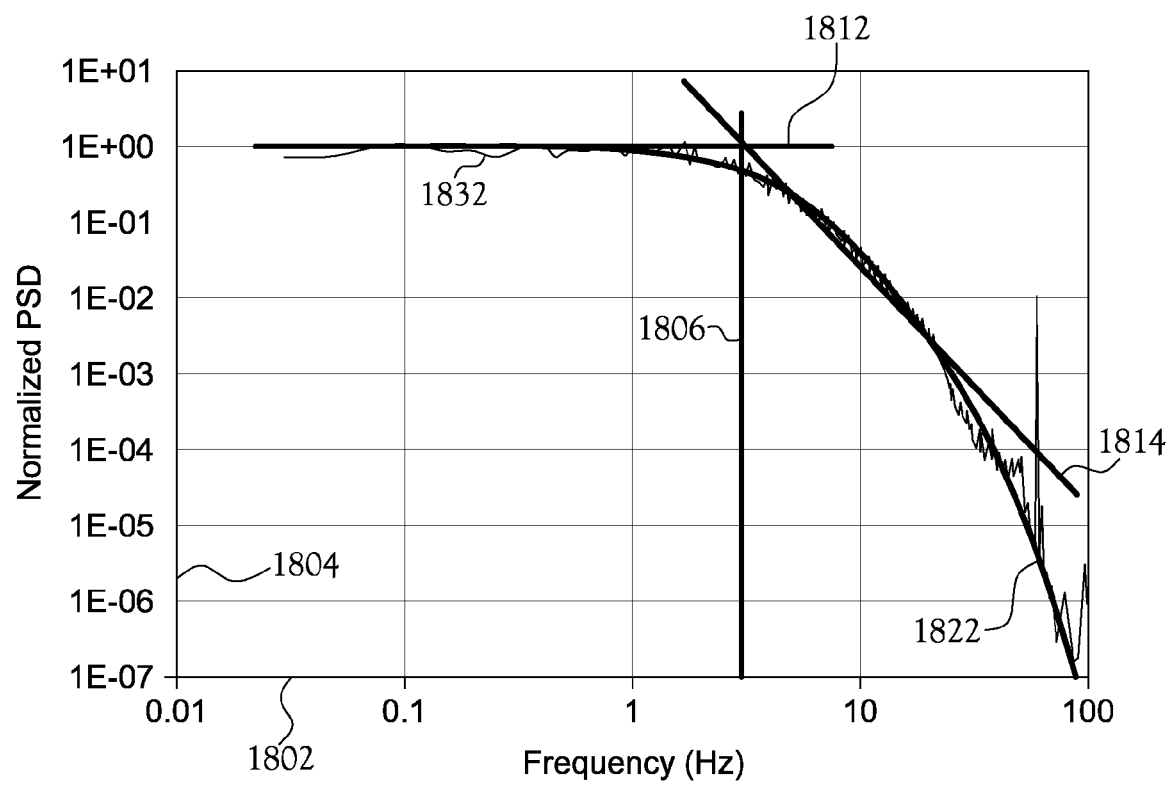
FIG. 18 is a PSD graph showing a typical sensor noise signal with a model fit.

FIG. 18 illustrates a power spectral density (PSD) graph showing a typical sensor noise signal with a model fit. A noise signal can be Fourier transformed using a Fast Fourier Transform (FFT) algorithm and its PSD calculated. The PSD has information about the dynamic health of the sensor. For example, the PSD break frequency and roll off rate can be measured and tracked to identify changes in detector dynamics. Also, the PSD data can be fit to a detector model to calculate and track response time as a means of determining the on-set of sensor degradation and to separate sensor problems from cable problems.

FIG. 18 plots a normalized PSD 1832 against the y-axis 1804 versus frequency against the x-axis 1802. The sensor noise data 1832 is plotted, along with a line 1812 showing the steady state value, a decade line 1814 showing the roll-off rate, and a model fit curve 1822. A break frequency line 1806 parallel to the y-axis 1804 shows the intersection of the steady state line 1812 with the decade roll-off line 1814. The slope of the decade roll-off line 1814 identifies the roll off rate of the sensor. The roll off rate, along with the frequency of the break frequency line 1812, are measured and trended for diagnostics of dynamic degradation of sensors or their constituents.

From the foregoing description, it will be recognized by those skilled in the art that an integrated system 10 for verifying the performance and health of instruments and processes has been provided. In particular, the system 10 provides for diagnosis of electrical and electronic circuits including the cables, the connectors, and the end devices, as well as the circuit cards and other electronics that are in the path of a signal from a sensor, or other end device, to its indicator. The system 10 monitors plant sensors and analyzes the condition of the sensors, cables, and processes being monitored. The analysis includes a dynamic analysis and an analysis of cable test data. The end devices being monitored provide signals, either during normal operation or as a result of test signals applied to the devices, that are analyzed to provide cable or wiring condition information. This analysis of cable condition is performed in conjunction with the dynamic analysis. In another embodiment, the system 10 takes corrective action as determined by the analysis results. The corrective action includes testing performed in situ, alarming out of tolerance conditions to an operator, initiating work orders for investigation by maintenance workers, or any other task suitable for the condition of the sensor or process.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A method for verifying the performance and health of a plurality of instruments and processes, said method comprising:

sampling data from a plurality of sensors, said sampled data corresponding to a plurality of signals each representing an output from one of said plurality of sensors;

storing said sampled data;

analyzing said sampled data, said step of analyzing including performing at least one analysis selected from a group including an analysis of an amplitude probability density, an analysis of a power spectral density, and an analysis of a time domain reflectometry;

using said analysis results to determine whether a corrective action is required; and initiating said corrective action automatically when said step of using said analysis results determines said corrective action is required.

2. The method of claim 1 wherein said step of analyzing includes performing at least one of a static analysis and a dynamic analysis.

3. The method of claim 1 wherein said step of analyzing includes performing a static analysis and a dynamic analysis.

4. The method of claim 1 further including a step of screening said sampled data after said step of sampling data.

5. The method of claim 1 wherein said corrective action includes at least one of an instrument calibration and an in situ test.

6. A method for verifying the performance and health of a plurality of instruments and processes, said method comprising the steps of:

sampling data from a plurality of sensors associated with the plurality of instruments and processes to produce sampled data, said sampled data corresponding to a plurality of signals each representing an output from one of said plurality of sensors;

storing said sampled data;

qualifying said sampled data to determine whether said sampled data is an outlier;

initiating a first corrective action when said step of qualifying said sampled data determines said sampled data is an outlier;

analyzing said sampled data to produce analysis results when said step of qualifying said sampled data determines said sampled data is not an outlier, said step of analyzing said sampled data including performing at least one analysis selected from a group including an analysis of an amplitude probability density, an analysis of a power spectral density, and an analysis of a time domain reflectometry; using said analysis results to determine whether a second corrective action is required; and initiating said second corrective action when said step of using said analysis results determines said second corrective action is required.

7. The method of claim 6 wherein said first corrective action includes at least one of discarding said sampled data, performing a calibration, and initiating in-situ testing.

8. The method of claim 6 wherein said second corrective action includes at least one of performing a calibration and initiating in-situ testing.

9. The method of claim 6 further comprising the step of reporting said analysis results.

10. The method of claim 6 wherein said step of analyzing said sampled data further comprises the steps of:
estimating a process value from said sampled data; and
identifying the deviation of each instrument channel from said estimated process value.

11. The method of claim 6 wherein said step of analyzing said sampled data further comprises the steps of
using a plurality of data analysis techniques to produce a plurality of interim results;
averaging said interim results to produce said analysis results.

12. The method of claim 10 wherein said plurality of data analysis techniques includes static analysis, dynamic response analysis, and transient process analysis.

* * * * *